(No Model.)
R. S. JENNINGS.
Method of Cleansing Filters.
No. 239,961. Patented April 12, 1881.
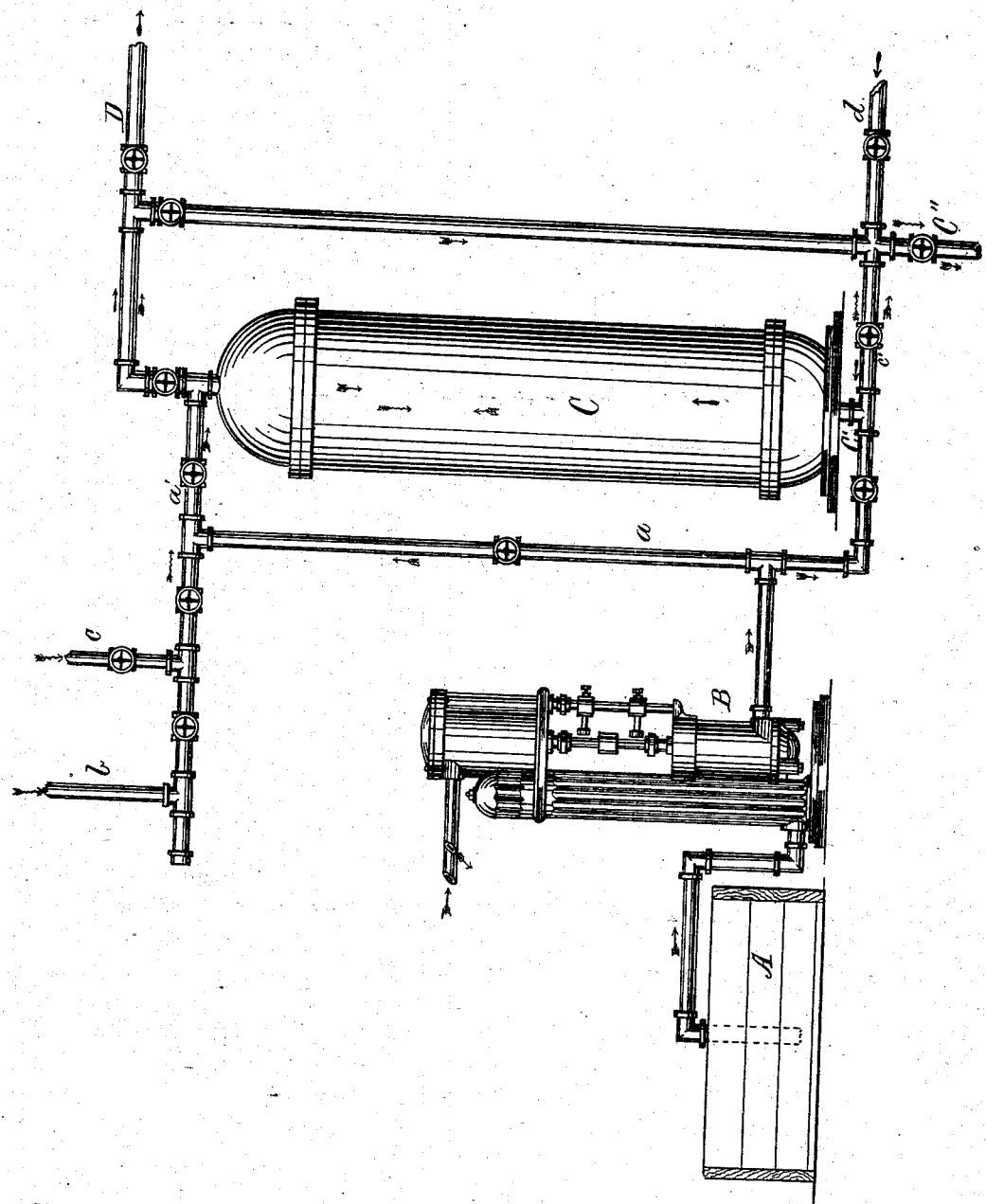
WITNESSES
Louis Johnson
H. W. McNeal.
INVENTOR
Ralph S. Jennings
By E. W. Johnson & Co.
ATTORNEYS.

UNITED STATES PATENT OFFICE.

RALPH S. JENNINGS, OF BALTIMORE, MARYLAND.

METHOD OF CLEANSING FILTERS.

SPECIFICATION forming part of Letters Patent No. 239,961, dated April 12, 1881.

Application filed June 1, 1880. (No model.)

*To all whom it may concern:*

Be it known that I, RALPH S. JENNINGS, a citizen of the United States, residing at Baltimore, in the county of Baltimore and State of Maryland, have invented certain new and useful Improvements in the Method of Cleansing Filters; and I do hereby declare that the following is a full, clear, and exact description of the invention, which will enable others skilled in the art to make and use the same.

This invention relates to certain improvements in the method or process of cleansing and drying the packing of filters, preferably of that class used in lard-refining, without removing the same from the filter-casing, and it is accomplished by the process hereinafter described.

Prior to my invention the packings of filters were revivified by removing the same from the filters and washing them with an alkaline solution, and then drying the same. The principal objections to this old method are, the removing and repacking of the filters, and the difficulty experienced in thoroughly washing and drying the packing. These objections are obviated by the use of my method.

On the annexed drawing I have shown an apparatus which may be used in carrying out my method; but I do not confine myself to this special form.

A represents a tank containing an alkaline solution, with which the packing is cleansed or revivified, and which solution is forced through the filter C by means of a force-pump, B. The filter C is provided with suitable connecting-pipes, which conduct the material to be filtered, the alkaline solution, the hot water, and the hot air to and from the filter. The pipes $a$ $a'$ conduct the alkaline solution into the filter under pressure, and it passes out through the lower pipe, C', of the filter and the coupled pipe $c'$ after passing through the filter-packing, thus removing the impurities from the filtering material.

When the filter has been thus cleansed by the alkaline solution, it is desirable to remove all traces of it from the packing. This is accomplished by passing a current of hot water into the filter and through the packing, thereby removing all traces of the alkaline solution from the filter. The hot water enters the pipe $b$ from the supply, and by opening its valve it is conducted downwardly through the pipe $a'$, and passes through the packing and finds egress through the pipes C' $c'$ C''.

When the alkaline solution has been removed by hot water the packing in the filter becomes saturated with water, which is objectionable in filters used in lard-refineries, for the reason that it would mingle with the lard, thereby deteriorating the value and the quality of the lard.

In order to dry the packing so the filter will be ready for use after cleansing, I introduce within the filter and through the packing material a current of hot air, which is admitted through the pipes $c$ $a'$, and passes out through the pipes C' $c'$ C'' below.

The connecting-pipes are provided with suitable cocks, as shown, for the purpose of opening and closing the connecting-pipes, and establishing the desired communications.

The water, lard, oils, sirups, or other substances, when being filtered, pass through the pipes $d$ C', thence upwardly through the filter, and out of the pipe D, thus causing the substance to be passed in an upward direction through the packing.

When cleansing the filters the hot water and hot air are passed through the filter in an opposite direction, and the alkaline solution may be passed through the filter in the same direction and then reversed.

No claim is made in this application for the apparatus herein shown and described for carrying out the process, as it will form the subject-matter of another application.

What I claim as new, and desire to secure by Letters Patent, is—

The method of revivifying the packing of a filter without removing it from the filter-case, the same consisting, essentially, of cleansing the filter by passing an alkaline solution through the packing, then washing the same with currents of hot water, and finally drying the packing with hot air, substantially as set forth.

In testimony that I claim the above I have hereunto subscribed my name in the presence of two witnesses.

RALPH S. JENNINGS.

Witnesses:
EUGENE W. JOHNSON,
H. W. MCNEAL.